(12) United States Patent
Banks et al.

(10) Patent No.: US 11,519,470 B2
(45) Date of Patent: Dec. 6, 2022

(54) INTEGRATED CAMSHAFT BRACKET FLANGE AND SPIDER

(71) Applicant: Bendix Commercial Vehicle Systems LLC, Elyria, OH (US)

(72) Inventors: Daniel E. Banks, Climax, MI (US); Richard L. Hilsbos, Elyria, OH (US)

(73) Assignee: Bendix Commercial Vehicle Systems LLC, Elyria, OH (US)

( * ) Notice: Subject to any disclaimer, the term of this patent is extended or adjusted under 35 U.S.C. 154(b) by 17 days.

(21) Appl. No.: 17/184,686

(22) Filed: Feb. 25, 2021

(65) Prior Publication Data

US 2022/0268327 A1    Aug. 25, 2022

(51) Int. Cl.
  *F16D 65/09*  (2006.01)
  *F16D 65/00*  (2006.01)
  *F16D 51/00*  (2006.01)
  *F16D 125/30* (2012.01)

(52) U.S. Cl.
  CPC ........ F16D 65/09 (2013.01); *F16D 2051/003* (2013.01); *F16D 2125/30* (2013.01); *F16D 2200/0004* (2013.01); *F16D 2200/0082* (2013.01)

(58) Field of Classification Search
  CPC ...................................................... F16D 65/09
  See application file for complete search history.

(56) References Cited

U.S. PATENT DOCUMENTS

| 4,200,174 A * | 4/1980 | Borugian | F16D 65/22 |
| | | | 188/250 C |
| 7,537,224 B2 | 5/2009 | Morris et al. | |
| 9,303,703 B2 | 4/2016 | Banks et al. | |
| 2015/0377311 A1 * | 12/2015 | Okuma | F16D 65/38 |
| | | | 188/1.11 E |
| 2016/0010709 A1 * | 1/2016 | Banks | F16D 65/60 |
| | | | 188/234 |

FOREIGN PATENT DOCUMENTS

| CA | 2395250 A1 * | 6/2001 | |
| DE | 10 2017 126 953 A1 | 5/2019 | |
| EP | 0205664 A2 * | 12/1986 | |
| WO | WO-9604489 A1 * | 2/1996 | F16D 51/22 |

\* cited by examiner

*Primary Examiner* — Melody M Burch
(74) *Attorney, Agent, or Firm* — Crowell & Moring LLP (57) ABSTRACT

An integrated brake spider and mounting bracket arrangement for a drum brake includes a brake spider with a spider mounting section, having openings through which fasteners may pass to secure the brake spider to an axle flange of a vehicle. The spider is also provided with a base section having an attachment surface for a bracket, and the bracket is secured by way of a metal fabrication process to the attachment surface of the base section and to actuator support structure adapted to support an actuator for the drum brake.

20 Claims, 9 Drawing Sheets

INTEGRATED CAMSHAFT BRACKET FLANGE AND SPIDER

Cross reference is made to U.S. patent application Ser. No. 17/155,148, filed Jan. 22, 2021, titled Drum Brake Spider Optimized for Vibration and Application.

BACKGROUND OF THE INVENTION a. Field of the Invention

An integrated brake spider and mounting bracket arrangement for a drum brake are secured together by way of a suitable metal fabrication process according to the present invention.

b. Background Art

U.S. Pat. No. 9,303,703 B2 to Banks et al. discloses a brake and bracket arrangement in which brackets are attached to a tube configured to receive a brake assembly camshaft. An actuator mounting bracket is disposed proximate a first end of the tube, and a brake spider mounting bracket is disposed proximate a second end of the tube. The spider mounting bracket includes a neck configured to receive the tube and position a weld securing the mounting bracket to the tube away from the spider mounting bracket to reduce stress.

Other documents that may be of interest are U.S. Pat. No. 7,537,224 B2 to Morris et al. and German Patent Application Publication DE 10 2017 126 953 A1 to Köchl.

BRIEF SUMMARY OF THE INVENTION

The present invention concerns an integrated brake spider and mounting bracket arrangement for a drum brake including a brake spider with a spider mounting section, having openings through which fasteners may pass to secure the brake spider to an axle flange of a vehicle. The spider is also provided with a base section having an attachment surface for a bracket. The bracket is secured by way of a metal fabrication process to the attachment surface of the base section and to actuator support structure adapted to support an actuator for the drum brake.

In certain configurations, the bracket can be secured to an outboard facing surface of the brake spider, with a single contact area between the actuator support structure and the mounting bracket located on an outboard side of the brake spider. In other configurations, the bracket can either be secured to an outboard facing surface of the brake spider, with a single contact area between the actuator support structure and the mounting bracket located on an inboard side of the brake spider, or secured to an outboard facing surface of the brake spider, with a pair of contact areas between the actuator support structure and the mounting bracket located on inboard and outboard sides of the brake spider. The bracket secured to the attachment surface of the base section could be cast, stamped, machined, or produced by way of additive manufacturing as desired.

A bearing disposed between a drum brake camshaft and the actuator support structure is positioned within the actuator support structure so that the bearing is displaced axially relative to a weld on the camshaft tube attaching the bracket to the camshaft tube. The bracket defines at least one contact area displaced relative to the weld on the camshaft tube, which may be a single contact area axially outboard relative to the spider, a single contact area axially inboard relative to the spider, or a pair of contact areas on opposite axial sides of the spider. A process of forming the integrated drum brake spider and mounting bracket arrangement is also described.

DETAILED DESCRIPTION OF THE INVENTION

The present invention has certain features in common with the brake and bracket arrangement disclosed by U.S. Pat. No. 9,303,703 B2 to Banks et al. mentioned above. The disclosure supplied by the Banks et al. '703 B2 patent is incorporated by reference herein in its entirety as non-essential subject matter.

Figure 1:
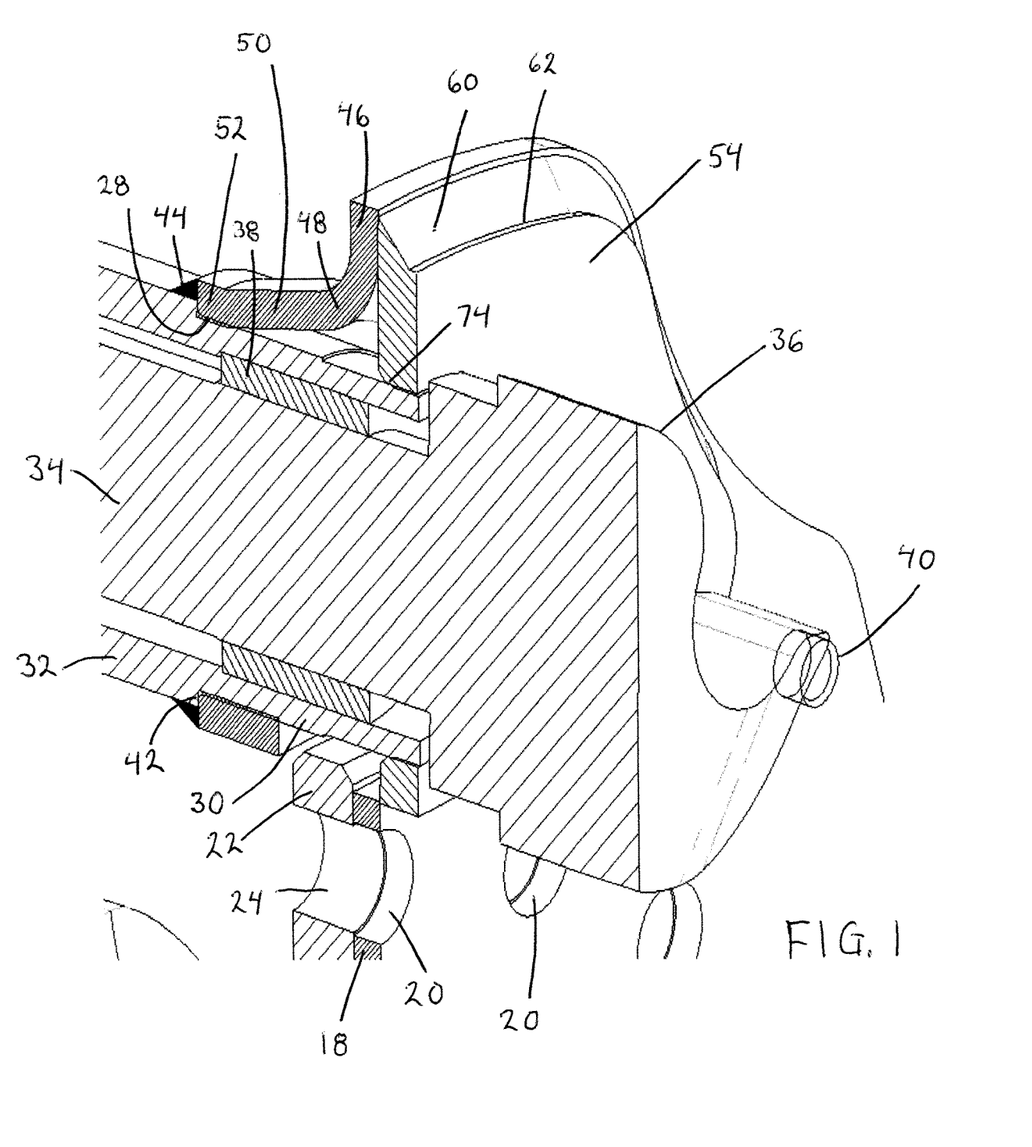
FIG. 1 is a front, part-sectional view, in perspective, of a relevant portion of a brake spider and an actuator mounted to the spider according to a first embodiment of the invention.

FIG. 1 illustrates part of a brake spider 18 having holes, bores, or other such openings 20 in a spider mounting section through which bolts or other such fasteners (not shown) may pass to secure the spider 18 to an axle flange 22. The axle flange 22 accordingly includes holes or bores 24 adapted to align with the brake spider holes or bores 20 to permit passage of the bolts mentioned in a known manner. The brake spider 18 is provided with a flange feature 26 (FIG. 2) defining an opening 28 dimensioned to circumferentially surround at least part of the outboard end section 30 of a camshaft tube 32. In certain arrangements, a section of the brake spider 18 may be deep drawn into a forming die by the mechanical action of a punch to produce the flange feature 26, although other ways of producing the flange feature 26 are envisioned as well. The spider 18 may include additional holes 40 facilitating attachment of the spider to other vehicle components (not shown).

A camshaft 34 having an S-cam actuator 36 at one end extends within the camshaft tube 32. Typically, the camshaft 34 extends through the tube 32 and connects to a slack adjuster (not shown) interposed between an end of the camshaft 34 opposite the S-cam actuator 36 and a fluid operated brake actuator (not shown). The S-cam actuator 36 is configured to engage cam followers at ends of drum brake shoes (not shown) to cause movement of the brake shoes into engagement with and disengagement from a brake drum braking surface, as described in the Banks et al. '703 B2 patent mentioned above. A suitable bearing 38 supports the camshaft 34 for rotation within the camshaft tube end section 30, with the camshaft tube 32 and/or the outboard end section 30 of that tube 32 thus forming actuator support structure (30, 32) adapted to support the actuator 36.

As illustrated, an axial end 42 of the flange feature 26 is secured by a weld 44 to the exterior of the camshaft tube 32. A step transition, between the outboard end section 30 and the remainder of the tube 32, aids in positioning the end 42 of the flange feature 26 on the tube. The flange feature 26 includes a base section 46, a tapered, part-conical section 50, a contoured section 48 located between the sections 46 and 50, and a part-cylindrical axially inboard end 52 having an interior shape that is the same as the exterior surface shape of the camshaft tube end section 30. Providing the interior of the end 52 and the exterior of the end section 30 with the same shapes promotes readily securing the end section 30 and the end 52 together with the weld 44.

FIG. 1 additionally shows a mounting bracket 54 disposed on the brake spider 18. The mounting bracket 54 is secured, by welding or, depending on loading, by way of another suitable metal fabrication process or joining technique such as brazing or soldering, to an outboard facing surface of the spider 18, and more particularly to an outboard facing attachment surface of the base section 46, as well as to an exterior surface of the outboard camshaft tube end section 30. After connecting the mounting bracket 54 and the base section 46 together, a tapered outer edge 60 extending from a step 62 on the mounting bracket adjoins the base section 46 along part of the base section outer edge.

Figure 2:
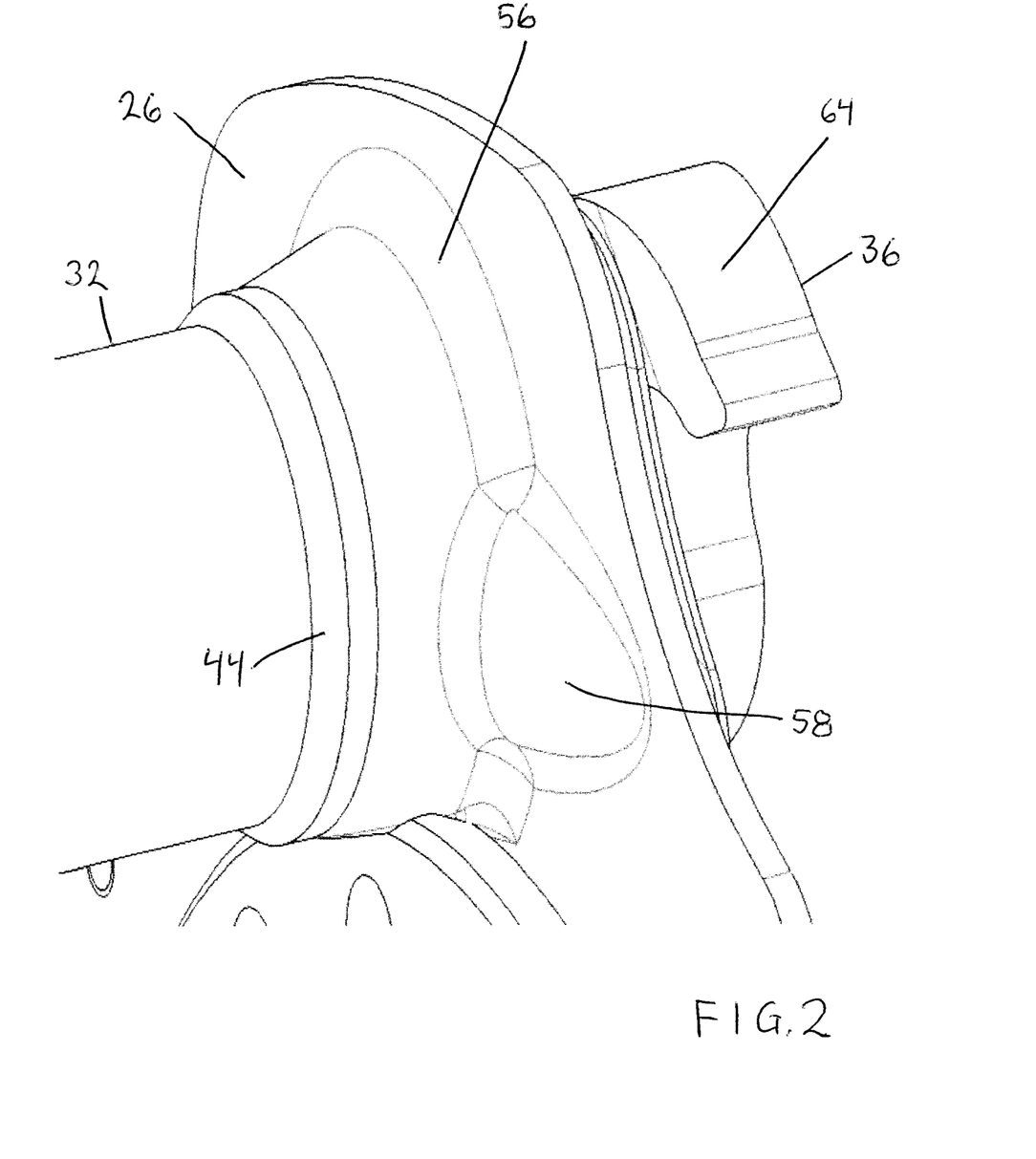
FIG. 2 is a rear view in perspective of the portion of the brake spider and the actuator shown in FIG. 1.

Although the brake spider flange feature 26 is shown in FIG. 1 as formed in one piece together with the remainder of the brake spider 18, alternative, multi-piece constructions are possible. Referring to FIG. 2, moreover, the brake spider flange feature 26 may include reinforcing structure, here in the form of fillet welds 56, provided over the contoured section 48 at the junction of the base section 46 and the tapered, part-conical section 50, and ribs 58, also provided over the contoured section 48. Welds such as the fillet welds 56 could be used to connect multiple brake spider flange feature pieces together Other features shown in FIG. 2, including the flange feature 26, the camshaft tube 32, the S-cam actuator 36, the weld 44, the fillets 56 formed by the stamping process while forming the conical drawn area 50 and the ribs 58, and the ribs 58 themselves, are configured essentially the same as the corresponding features shown in FIG. 1.

Figure 3:
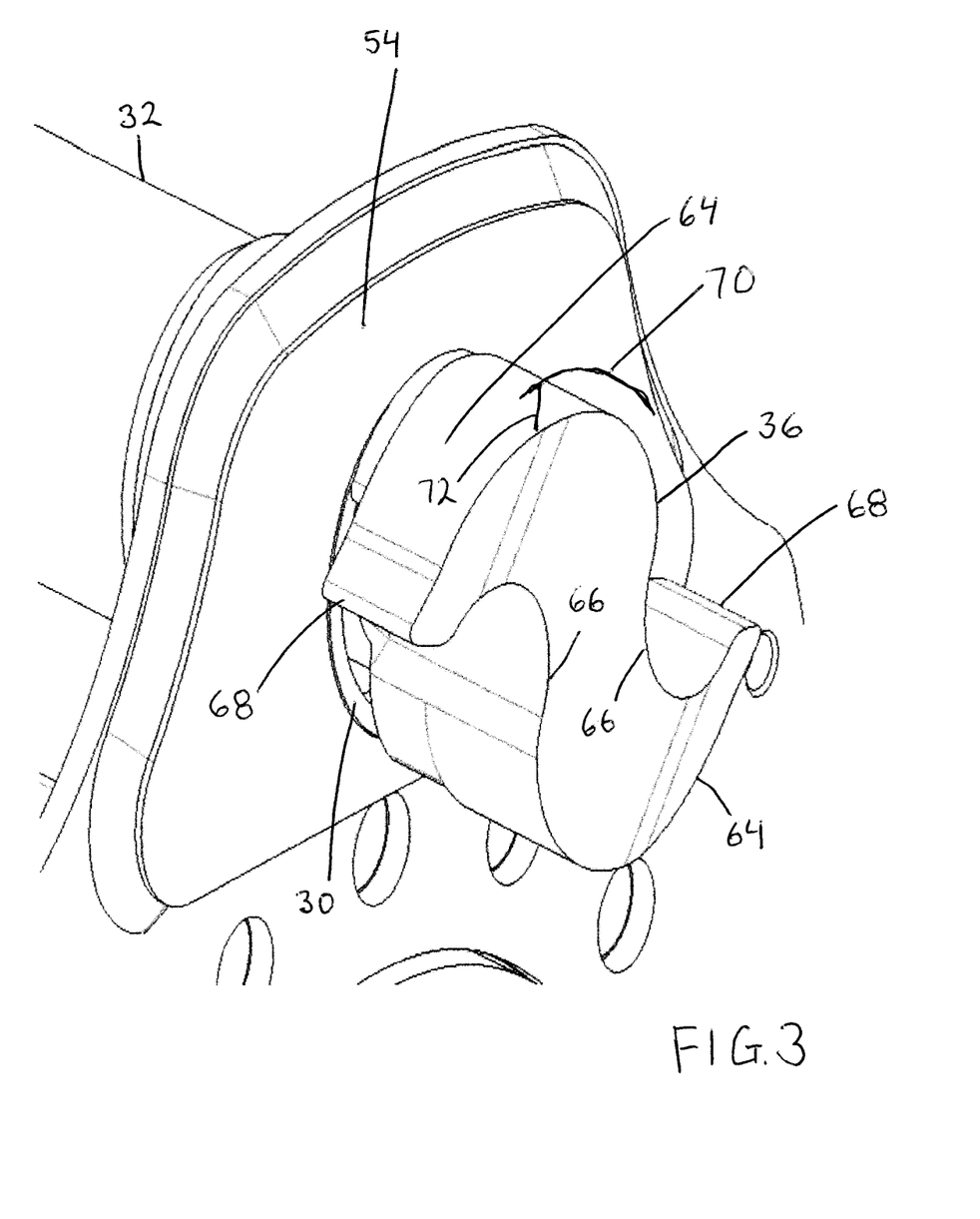
FIG. 3 is a view similar to that of FIG. 1, without any sectional illustration, showing certain dimensional characteristics of the first embodiment.

In the view provided by FIG. 3, which similar to the view supplied by FIG. 1 but without any sectional representations, the configuration of the S-cam actuator 36 is visible. The actuator 36 has opposed ramps 64, one of which is also visible in FIG. 2, designed to engage the cam followers of the drum brake shoes referred to previously. Each ramp 64 transitions at an inflection 66 from an outwardly facing actuator surface to an inwardly facing actuator surface. Junctions between the opposed ramps 64 occur at a pair of actuator cam nose locations 68, such that rotation of the cam actuator 36 causes the junctions mentioned to define a translation circle or cylinder 70 with a translation dimension 72. The translation dimension 72 is the distance that cam followers at drum brake shoe ends are displaced by rotation of the S-cam actuator 36 as the brake shoes are actuated and released by movement of the camshaft 34. Because the diameter of the translation circle or cylinder 70 and the overall size of the cam actuator 36 exceed the end opening diameter of the camshaft tube end section 30, the camshaft 34 must be assembled from the side of the brake spider 18 (the outboard side in FIGS. 1-3) opposite the side (the inboard side in FIGS. 1-3) on which the remainder of the brake actuation components are located. The S-cam actuator 36 is configured to engage cam followers at ends of drum brake shoes (not shown) to cause movement of the brake shoes into engagement with and disengagement from a brake drum braking surface.

By way of an assembly configured as described above and illustrated by way of example in FIGS. 1-3, the flange feature 26 may be a deep drawn feature of the spider 18 to which the mounting bracket 54 is welded or otherwise secured on the outboard side of the feature 26. The deep drawn flange feature 26 (FIG. 2), in other words, is formed into the spider, and the mounting bracket 54 is welded or otherwise secured to the outboard side of the spider 18. The flange feature 26 is added as an inboard draw to the spider 18, permitting previously required fasteners to be removed, and the mounting bracket 54, as a flat plate, to be welded to the outboard side of spider 18. This profile could possibly be modified, of course, and the spider 18 with the flange feature 26 could be formed to create a similar weld to anchor an end of spider.

Figure 4:
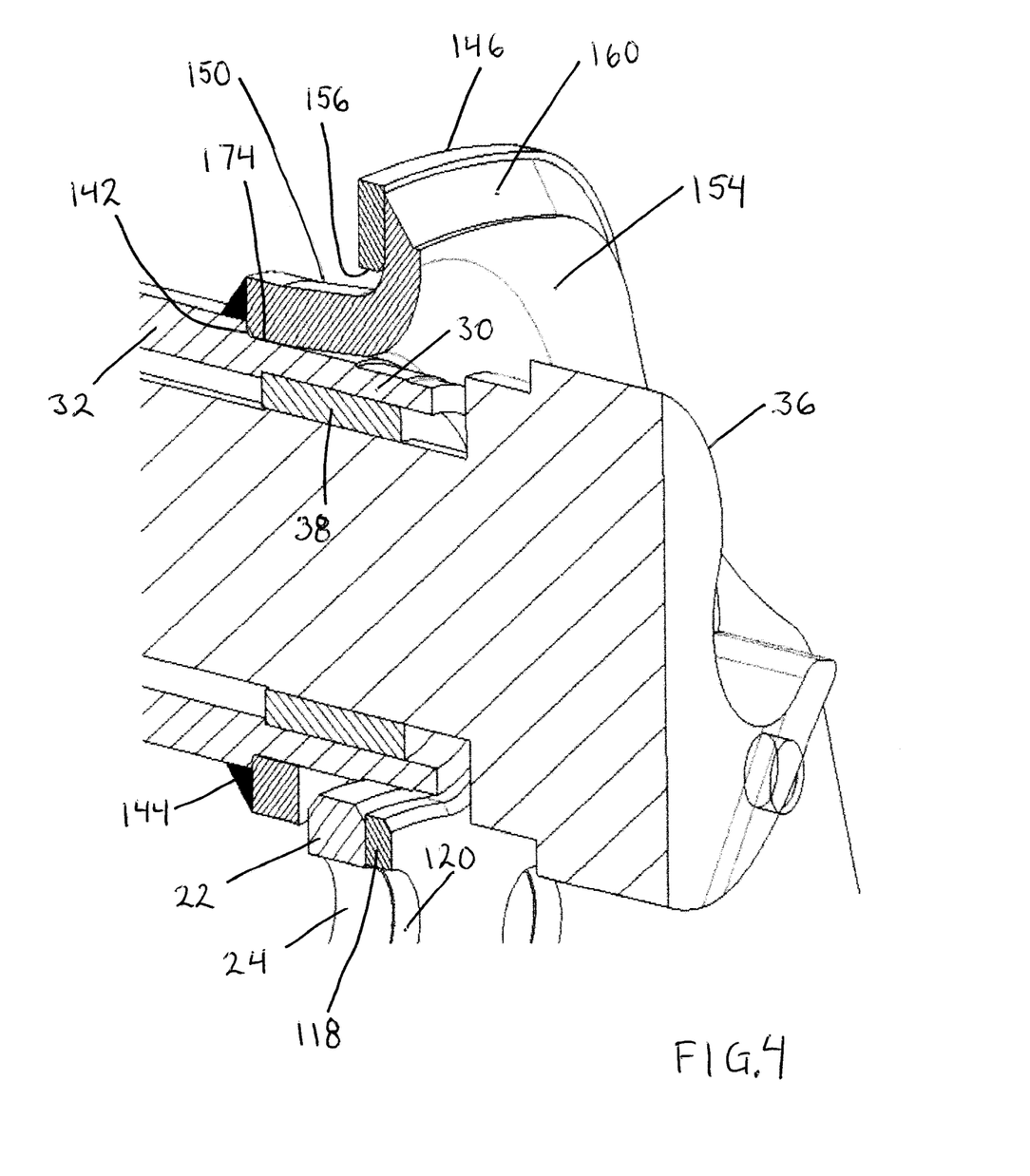
FIG. 4 is a view similar to that of FIG. 1, but showing components according to a second embodiment of the invention.
Figure 5:
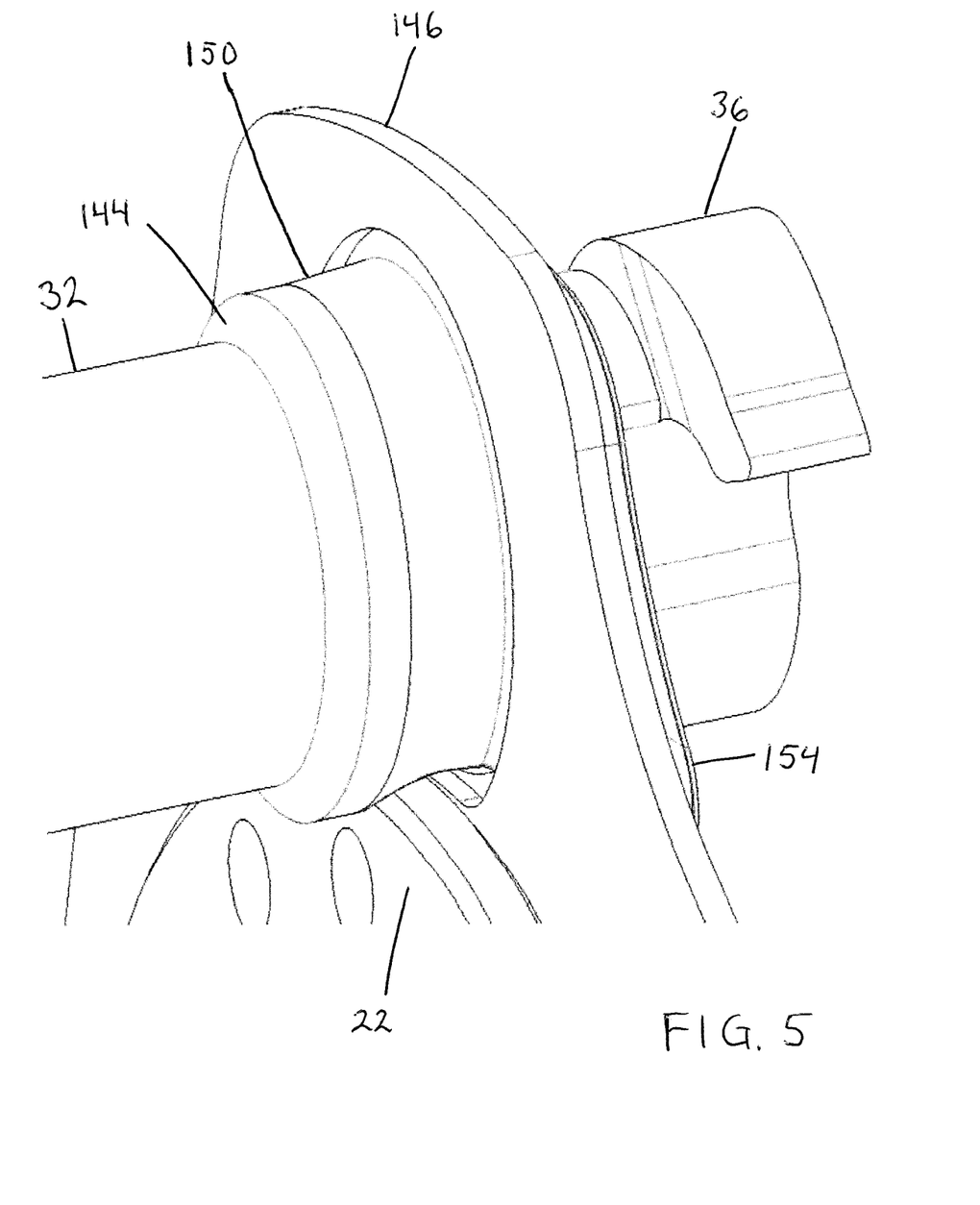
FIG. 5 is a view similar to that of FIG. 2, but showing the second embodiment.
Figure 6:
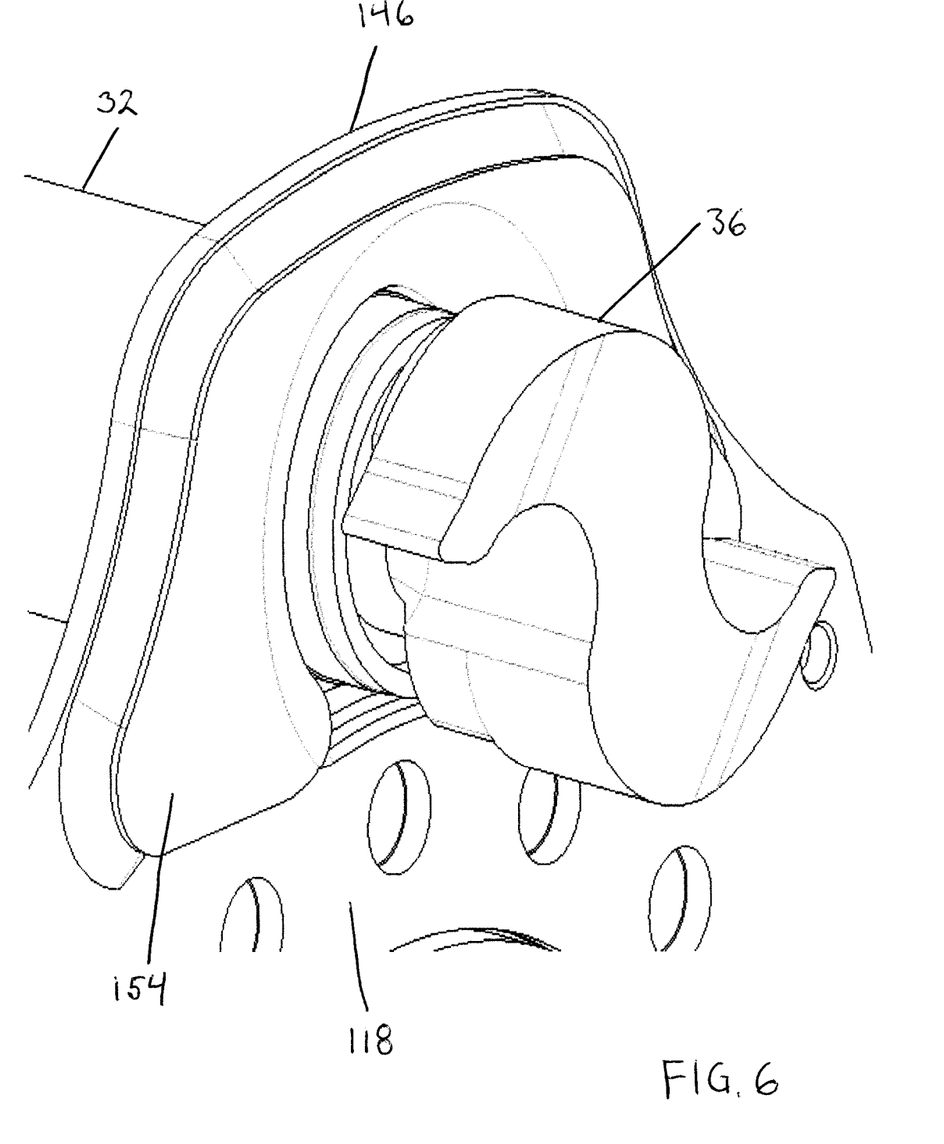
FIG. 6 is a view similar to that of FIG. 3, but showing the second embodiment.

FIGS. 4-6 illustrate an alternative to the design represented in FIGS. 1-3, although the design of FIGS. 1-3 and the design of FIGS. 4-6 share a number of features that will not be unnecessarily discussed again. In the arrangement shown in FIGS. 4-6, a mounting bracket 154 is configured in such a way as to eliminate the need to provide a spider 118 with the relatively complex flange feature 26 included in the design of FIGS. 1-3, where the flange feature 26 includes the tapered, part-conical section 50, the contoured section 48, and the part-cylindrical axially inboard end 52.

As with the design of FIGS. 1-3, the spider 118 includes holes, bores, or other such openings 120 in a spider mounting section adapted to align with holes or bores 24 in an axle flange 22 to permit passage of bolts used to secure the axle flange 22 and the spider 118 together. In the design represented in FIGS. 4-6, however, the mounting bracket 154, itself, is stamped or otherwise formed into a configuration having a tapered, part-conical section 150 dimensioned to project in an inboard direction through an opening 156 in a base section 146 of the spider 118. An inboard-oriented surface of the mounting bracket 154, coextensive with the tapered mounting bracket outer edge 160, is welded to an outboard-facing attachment surface of the spider base section 146. The inboard axial end 142 of the part-conical mounting bracket section 150 is attached as well by a weld 144 to the outboard end section 30 of a camshaft tube 32. By way of the design shown in FIGS. 4-6, in which the stamped mounting bracket 154 is welded or, depending on loading, secured by way of another suitable metal fabrication process or joining technique such as brazing or soldering to the outboard spider side and the camshaft tube 32, forces imparted to the mounting bracket 154 upon pivoting of the camshaft 34 are displaced from the location of the weld between the inboard-oriented surface of the mounting bracket 154 and the outboard-facing surface of the spider base section 146. The mounting bracket 154 is thus welded to the outboard side of spider 118 and passes by way of the opening 156 inboard, through spider 118, to permit attachment by the weld 144 to the tube inboard of the pivot point and away from vertical loads to protect the weld 144 from high stresses. The arrangement of FIGS. 4-6 removes the need for a separate connector such as the flange feature 26 or other types of fasteners. Of course, the profile could be modified, and a similar spider and bracket structure could alternatively or additionally be formed at the other end of the spider 118 to create a shoe anchor or shoe anchors with only one respective contact point between the bracket and the tube.

Figure 7:
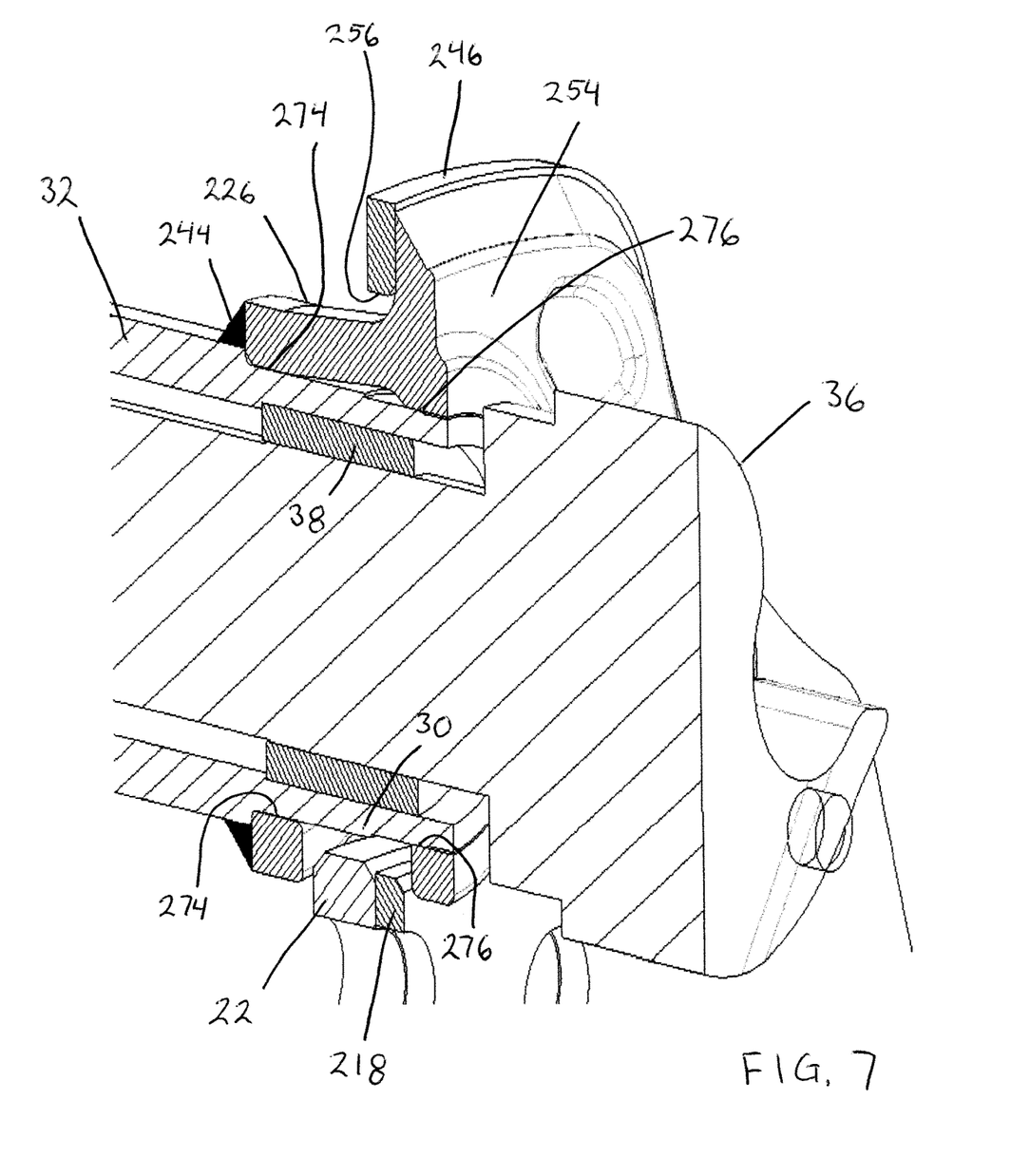
FIG. 7 is a view similar to that of FIG. 1, but showing components according to a third embodiment of the invention.
Figure 8:
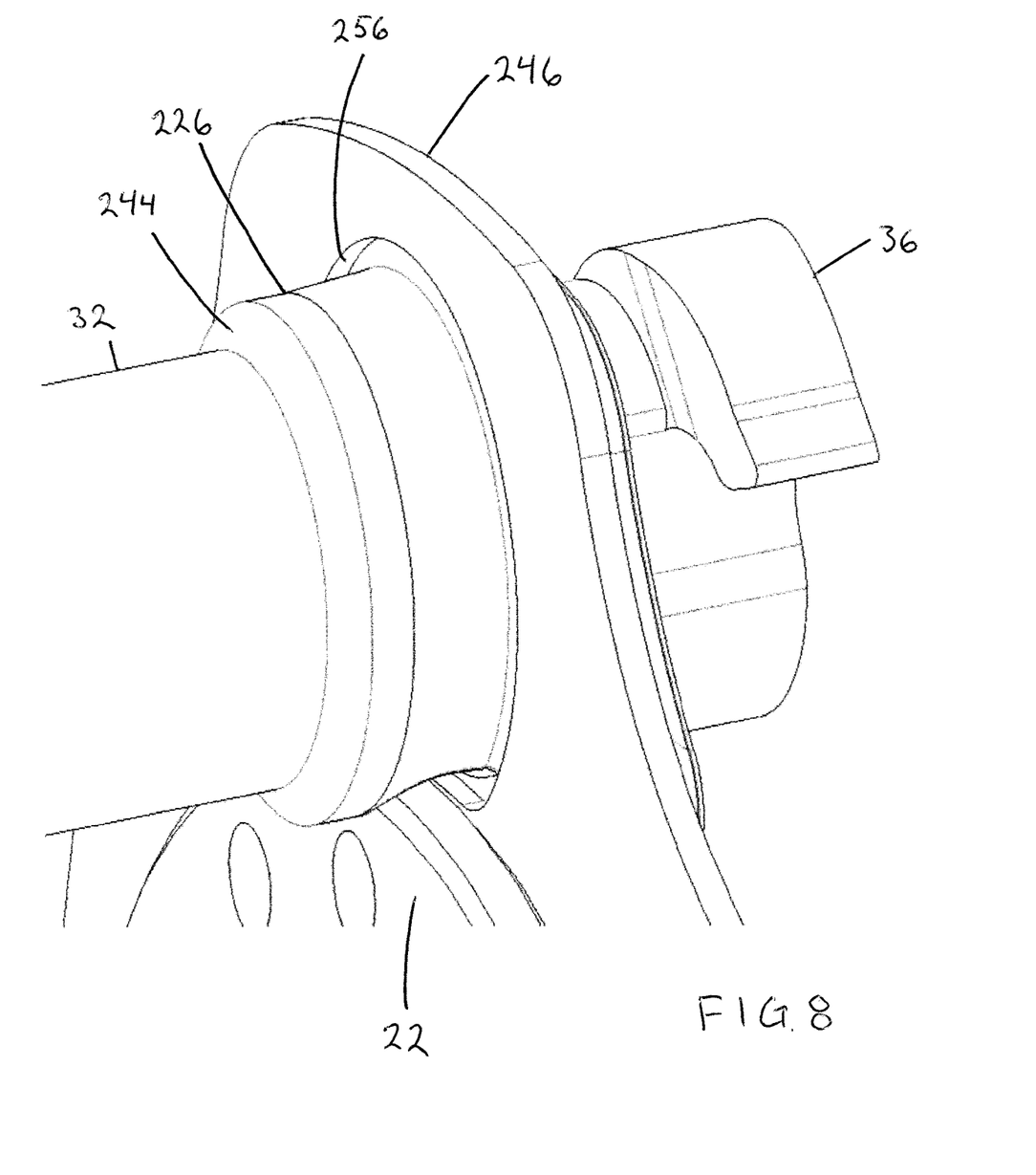
FIG. 8 is a view similar to that of FIG. 2, but showing the third embodiment.
Figure 9:
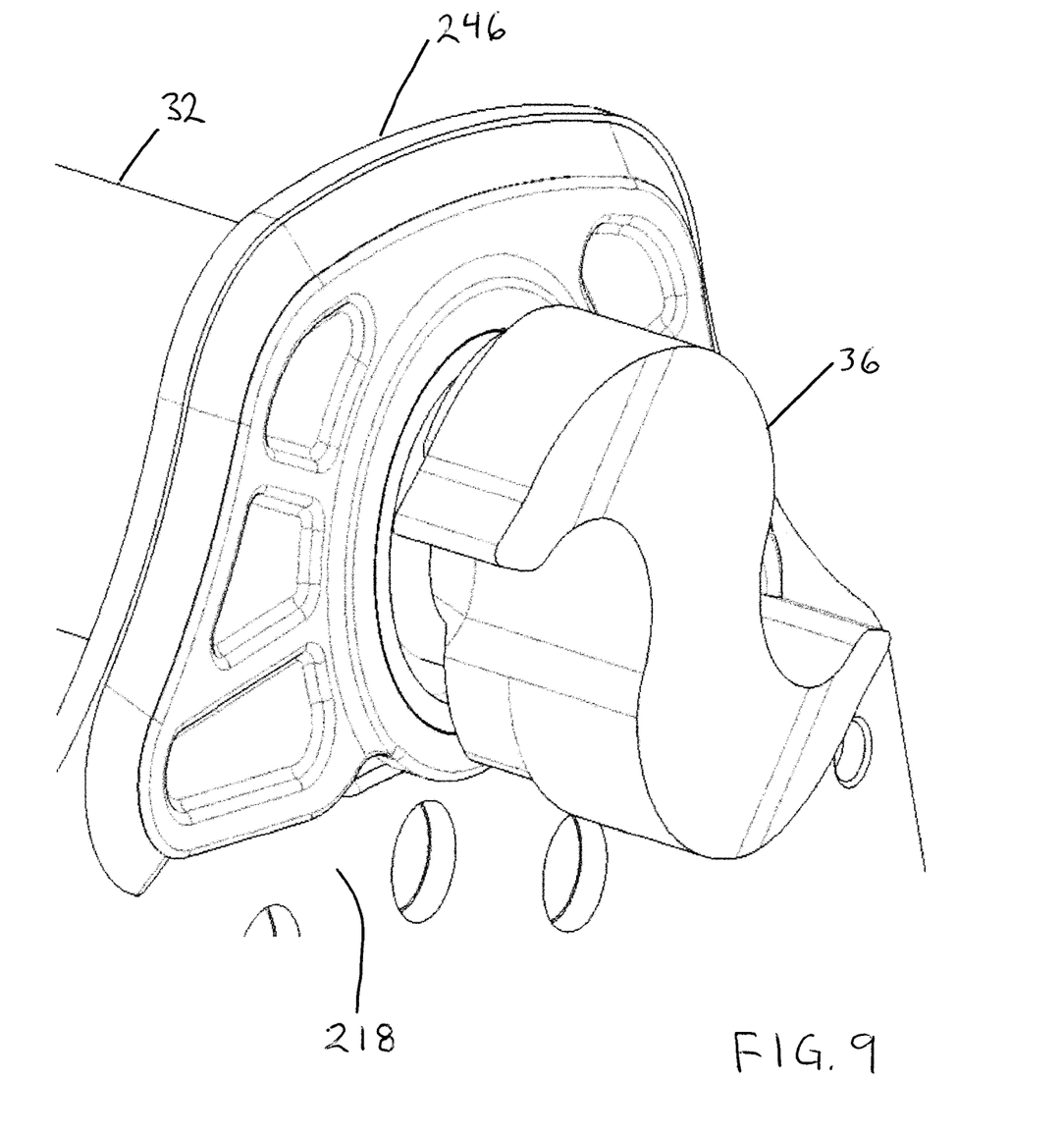
FIG. 9 is a view similar to that of FIG. 3, but showing the third embodiment.

Each of the embodiments shown in FIGS. 1-3 and FIGS. 4-6 has a single contact area between the camshaft tube end section 30 and the respective mounting bracket 54 or 154, with the single contact area 74 between the outboard camshaft tube end section 30 and the mounting bracket 54 being located on an outboard side of the brake spider 18, and the single contact area 174 between the camshaft tube end section 30 and the mounting bracket 154 being located on the inboard side of the brake spider 118. Referring now to FIGS. 7-9, a further embodiment is shown in which dual areas of contact 274 and 276 between the camshaft tube end section 30 and a mounting bracket 254 are provided. The design of FIGS. 7-9 and the designs of FIGS. 1-6 share a number of features that will not be unnecessarily discussed again. However, in the alternative design shown in FIGS. 7-9, one of the dual areas of contact, area 274, is disposed inboard with respect to the spider 218, while the other of the dual areas of contact, area 276, is disposed outboard with respect to the spider 218. The mounting bracket 254, itself, is stamped or otherwise formed into a configuration having a conical section 226 dimensioned to project in an inboard direction through an opening 256 in a base section 246 of the spider 218. The conical section 226 may be a non-stamped, deep drawn feature of the mounting bracket 254. The arrangement represented in FIGS. 7-9 permits the mounting bracket 254 to be mounted on an outboard attachment surface of the spider base section 246. The dual areas of contact 274 and 276 between the camshaft tube end section 30 and the mounting bracket 254 are defined by axially separated minimum diameter sections of the mounting bracket 254. The mounting bracket 254 is attached, e.g. by welding or, depending on loading, by way of another suitable metal fabrication process or joining technique, such as brazing or soldering, to the outboard side of the spider 218, and the conical section 226 passes inboard through the spider 218 to be welded to the camshaft tube end section 30.

By way of the constructions described, potential configurations could include removing fasteners and welding or otherwise securing the bracket to the spider. The profile could be readily modified, bearing in mind that a main intent is to move the weld between the tube and the bracket away from the attachment point of the bracket to the spider, where the deflection and high stresses occur. In each embodiment described, the bearing 38 is positioned axially away from the translation circle or cylinder 70 defined by rotation of the cam actuator 36 to an extent that is limited so that the bearing 38 is not aligned with a weld 44, 144, or 244 on the camshaft tube 32. Locating the weld inboard of the location of the bearing 38 for the S-cam actuator 36 in this way helps protect the weld from high stresses.

In each of the embodiments described, the mounting bracket 54, 154, or 254 may be cast, stamped, machined, or produced by way of additive manufacturing, and then welded to both an outboard facing side of the spider 18, 118, or 218 and the outboard camshaft tube end section 30. Each spider could also be cast, stamped, machined, or produced by way of additive manufacturing, as could the flange feature 26 in the embodiment shown in FIGS. 1-3.

The foregoing disclosure has been set forth merely to illustrate the invention and is not intended to be limiting. Modifications of the disclosed embodiments incorporating the spirit and substance of the invention may occur to persons skilled in the art, and the invention should be construed to include everything within the scope of the invention ultimately claimed.

The invention claimed is:

1. An integrated brake spider and mounting bracket arrangement for a drum brake, comprising:
    a brake spider including a spider mounting section, having openings through which fasteners may pass to secure the brake spider to an axle flange of a vehicle, and a base section having an attachment surface defined by an outboard facing surface of the brake spider, and
    a mounting bracket secured by way of a metal fabrication process to the attachment surface of the base section and to actuator support structure adapted to support an actuator for the drum brake,
    wherein the mounting bracket is secured to the outboard facing surface of the brake spider, and a single contact area between the actuator support structure and the mounting bracket is located on an outboard side of the brake spider.

2. The arrangement of claim 1, wherein a single contact area between the actuator support structure and the mounting bracket is also located on an inboard side of the brake spider.

3. An integrated brake spider and mounting bracket arrangement for a drum brake, comprising:
    a brake spider including a spider mounting section, having openings through which fasteners may pass to secure the brake spider to an axle flange of a vehicle, and a base section having an attachment surface defined by an outboard facing surface of the brake spider, and
    a mounting bracket secured by way of a metal fabrication process to the attachment surface of the base section and to actuator support structure adapted to support an actuator for the drum brake,
    wherein the mounting bracket is secured to the outboard facing surface of the brake spider, and a pair of contact areas between the actuator support structure and the mounting bracket are located on inboard and outboard sides of the brake spider.

4. The arrangement of claim 1, wherein the mounting bracket secured to the attachment surface of the base section is cast, stamped, machined, or produced by way of additive manufacturing.

5. The arrangement of claim 1, further comprising a bearing disposed between a drum brake camshaft and the actuator support structure.

6. The arrangement of claim 5, wherein the bearing is positioned within the actuator support structure so that the bearing is displaced axially relative to a weld on a camshaft tube attaching the bracket to the camshaft tube.

7. The arrangement of claim 6, wherein the mounting bracket defines at least one contact area spaced relative to the weld on the camshaft tube.

8. The arrangement of claim 7, wherein the at least one contact area is a single contact area axially outboard relative to the spider.

9. The arrangement of claim 7, wherein the at least one contact area is a single contact area axially inboard relative to the spider.

10. The arrangement of claim 7, wherein the at least one contact area includes a pair of contact areas on opposite axial sides of the spider.

11. A process of forming an integrated brake spider and mounting bracket arrangement for a drum brake, comprising:

providing a brake spider including a spider mounting section, having openings through which fasteners may pass to secure the brake spider to an axle flange of a vehicle, and a base section having an attachment surface defined by an outboard facing surface of the brake spider, and securing a mounting bracket by way of a metal fabrication process to the attachment surface of the base section and to actuator support structure adapted to support an actuator for the drum brake, wherein securing the mounting bracket includes securing said mounting bracket to the outboard facing surface of the brake spider, and producing a single contact area between the actuator support structure and the mounting bracket located on an outboard side of the brake spider.

12. The process of claim 11, wherein securing the mounting bracket further includes producing a single contact area between the actuator support structure and the mounting bracket located on an inboard side of the brake spider.

13. A process of forming an integrated brake spider and mounting bracket arrangement for a drum brake, comprising:

providing a brake spider including a spider mounting section, having openings through which fasteners may pass to secure the brake spider to an axle flange of a vehicle, and a base section having an attachment surface defined by an outboard facing surface of the brake spider, and securing a mounting bracket by way of a metal fabrication process to the attachment surface of the base section and to actuator support structure adapted to support an actuator for the drum brake, wherein securing the mounting bracket includes securing said mounting bracket to the outboard facing surface of the brake spider, and producing a pair of contact areas between the actuator support structure and the mounting bracket located on inboard and outboard sides of the brake spider.

14. The process of claim 11, wherein the mounting bracket secured to the attachment surface of the base section is cast, stamped, machined, or produced by way of additive manufacturing.

15. The process of claim 11, further comprising disposing a bearing between a drum brake camshaft and the actuator support structure.

16. The process of claim 15, further comprising positioning the bearing within the actuator support structure so that the bearing is displaced axially relative to a weld on a camshaft tube attaching the mounting bracket to the camshaft tube.

17. The process of claim 16, wherein the mounting bracket defines at least one contact area displaced relative to the weld on the camshaft tube.

18. The process of claim 17, wherein the at least one contact area is a single contact area axially outboard relative to the spider.

19. The process of claim 17, wherein the at least one contact area is a single contact area axially inboard relative to the spider.

20. The process of claim 17, wherein the at least one contact area includes a pair of contact areas on opposite axial sides of the spider.

* * * * *